US012134575B2

(12) United States Patent
Capeau et al.

(10) Patent No.: US 12,134,575 B2
(45) Date of Patent: Nov. 5, 2024

(54) TREATMENT METHOD AND DEVICE FOR DEHYDRATION OF ORGANIC SLUDGES

(71) Applicant: Orege, Voisins-le-Bretonneux (FR)

(72) Inventors: Patrice Capeau, Marseilles (FR); Pascal Gendrot, Le Vesinet (FR)

(73) Assignee: Orege, Voisins-le-Bretonneux (FR)

( * ) Notice: Subject to any disclaimer, the term of this patent is extended or adjusted under 35 U.S.C. 154(b) by 0 days.

(21) Appl. No.: 17/059,601

(22) PCT Filed: May 29, 2019

(86) PCT No.: PCT/EP2019/064113
§ 371 (c)(1),
(2) Date: Nov. 30, 2020

(87) PCT Pub. No.: WO2019/229196
PCT Pub. Date: Dec. 5, 2019

(65) Prior Publication Data
US 2021/0221725 A1     Jul. 22, 2021

(30) Foreign Application Priority Data
Jun. 1, 2018   (FR) ...................................... 1854796

(51) Int. Cl.
*C02F 11/147*   (2019.01)
*C02F 9/00*     (2023.01)
*C02F 1/00*     (2023.01)
*C02F 1/20*     (2023.01)
*C02F 1/24*     (2023.01)
(Continued)

(52) U.S. Cl.
CPC .............. *C02F 11/147* (2019.01); *C02F 9/00* (2013.01); *C02F 2001/007* (2013.01); *C02F 1/20* (2013.01); *C02F 1/24* (2013.01); *C02F 11/06* (2013.01); *C02F 11/122* (2013.01); *C02F 11/126* (2013.01)

(58) Field of Classification Search
CPC .................................................... C02F 11/147
See application file for complete search history.

(56) References Cited

U.S. PATENT DOCUMENTS 6,224,772 B1    5/2001  Golcz
2009/0255678 A1*  10/2009  Rosine ..................... C02F 9/00
                                                                  166/305.1

(Continued)

FOREIGN PATENT DOCUMENTS

FR        3013701 A1    5/2015
WO    2016097343 A1    6/2016

OTHER PUBLICATIONS

Jul. 26, 2019, International Search Report of PCT/EP2019/064113.

*Primary Examiner* — Peter Keyworth
(74) *Attorney, Agent, or Firm* — Banner & Witcoff, Ltd.

(57) ABSTRACT

The invention relates to a method and a device for continuously or semi-continuously treating/dehydrating organic sludge (1, 41, 69), wherein a three-phase emulsion of air, solid matter and water is produced by injecting air (6, 47, 68) into the sludge, introducing a flocculant (13, 50, F) into said emulsion in order to create a floc (14, 51) and then degassing said floc at atmospheric pressure. The floc is degassed by soft impact of the floc on itself or on an energy absorbing shutter (39, C), braking the floc, and the floc matured in this way is recovered in a filtration and/or decanting device (56, 74).

19 Claims, 6 Drawing Sheets

(51) Int. Cl.
    *C02F 11/06*     (2006.01)
    *C02F 11/122*     (2019.01)
    *C02F 11/126*     (2019.01)

(56) References Cited

U.S. PATENT DOCUMENTS

2015/0283557 A1* 10/2015 Park .................. B03D 1/24
                                                                210/151
2016/0160489 A1* 6/2016 Garbon .............. B01D 21/0006
                                                                210/170.03
2016/0376182 A1* 12/2016 Capeau ................... C02F 1/56
                                                                210/704
2017/0152162 A1* 6/2017 Cam .................. C02F 1/46109

* cited by examiner

TREATMENT METHOD AND DEVICE FOR DEHYDRATION OF ORGANIC SLUDGES

The present invention relates to a method for continuous or semi-continuous treatment and/or dehydration of liquid organic sludge by injection of air into the flow of sludge, and injection of flocculant into the emulsion thus produced.

It also relates to a device for treatment/dehydration of liquid sludges which implements a method of this type.

The invention has a particularly important, although not exclusive application in the field of the reduction of volume of organic sludges obtained from domestic or industrial water purification stations.

"Organic sludge" means a sludge which is substantially charged with organic material, i.e. comprising more than 50%, for example more than 70%, of material produced by living beings, vegetables, animals, fungi and other decomposers, such as microorganisms.

Sludge dehydration devices are already known (FR 2 729 383) which make it possible to improve the dryness of compact mineral or organic sludges thanks to mechanical scrapers which are displaced on the permeable base of storage tanks.

Devices of this type comprise risks of clogging which require de-clogging means, and their mechanical appliances have weaknesses. In addition, organic sludges are colloidal substances, the decantation of which is slow and inefficient.

Draining table systems are also known, which however have significant operating constraints, and require installations of a considerable size. Moreover they are inefficient.

Static systems are also known which are formed by decantation vats.

However, in the case of static thickening, the durations of stay are considerable, and unfortunately give rise to phenomena of fermentation of the sludges, causing foul odors and an increase in the colloidal nature of said sludges.

A method is also known (FR 2 966 818) for separation of the liquid and material in suspension of a sludge, wherein sludge and air with a high flow rate are injected into an enclosure with a small volume.

Although this method is quite efficient, it is substantially applicable to highly mineralized sludges (i.e. which have a percentage of organic material out of 100% by weight of solid material which is less than 5 to 15%).

Document WO 2015/079175 for its part describes a method for treatment of liquid sludge by injection of air into a flow of sludge with adjustment of the speeds of the flows of air and sludge, and wherein the sludge is treated by flocculation/decantation, with injection of a flocculation reagent taking place before improvement of the dehydration in a thickener spillway. In this case also, and although the method is quite efficient, the drying can be further improved, in particular as far as the flocculation time and the quantity of flocculant necessary are concerned.

The objective of the present invention is to provide a method and a device which fulfil the requirements in practice better than those previously known, in particular in that, by means of appropriate degassing, it makes it possible to obtain a flocculated emulsion more rapidly, with less reagent (flocculent material), and with a particularly compact installation.

By using the degassing energy astutely in order to create a floc of thickened sludge, which is then favorable for extraction into a simple scraping system for example, and without untimely destruction of said floc, substantially instantaneous separation is obtained of the sludge floc and the water, which is released by flotation.

For this purpose, the invention starts with the principle of continuous or semi-continuous treatment and/or dehydration (by means of alternative batches) of a sludge, wherein an emulsion is created with air which is degassed, and flocculation takes place using the energy of said degassing as the kinetic maturing energy.

The degassing function and the energy released are thus used to improve the penetration of the flocculant into the sludge.

Advantageously, the sludges are also concentrated rapidly downstream in line in a concentrator container.

For this purpose, the invention proposes in particular a method for continuous or semi-continuous treatment/dehydration of organic sludge, wherein a three-phase emulsion is produced of air, solid material and water, by injecting air into the sludge, a flocculant is introduced into said emulsion in order to create a floc, then said floc is degassed at atmospheric pressure, characterized in that the floc is degassed by soft impact of the floc on itself or on an energy-absorbing shutter, the floc is braked, and the floc thus matured is recuperated into a filtration and/or decantation device.

"Energy-absorbing" means designed to reduce the kinetic energy of the floc by a factor which is equal to at least two.

The impact is of a liquid/liquid type.

Gentle and partial degassing of this type of the excess air does not damage the emulsion, and will make it possible to flocculate better by using the energy of the degassing, which permits a decrease of 10 to 20%, or even up to 50%, in the time for mixing of the polymer, as well as a reduction of the quantity of polymer to be used.

"Soft impact" means an impact or progressive contact without percussion either on the floc itself, by means of falling by gravity onto itself for example, or onto a shutter or wall or disc for absorption of the energy, for example a shutter which is flexible, or has a reduced dimension of, for example, a few cm$^2$ (for example of x×y, where x and y<10 cm), designed to brake the flow, without however constituting an irregularity creating a sudden excess pressure in the flow.

"Shutter" or "flexible shutter" means a resilient or semi-rigid element, which for example is made of rubber or the equivalent, which can bear and/or create a loss of load by braking, thus permitting degassing by pressure, without however destroying flocs of sludge.

A system of this type permits degassing of the excess air, whilst ensuring the continuity of constitution of the floc, as well as compliance with the speeds of passage or transfer of said floc during the process.

As far as the polymer is concerned, conventionally the operator of a sludge dehydration line will tend to provide excess polymer in order to obtain a floc which is certainly heavier, but is not liable to break up.

With the invention, this risk is minimized considerably, since, by improving the flocculation process in a simple manner by using the degassing energy, the operator of an installation is no longer inclined to over-dose.

In fact, results are obtained on the treatment lines which make it possible to save up to 30% of the flocculant.

"Semi-continuous" means by successive batches, which are substituted for one another instantly, or substantially without stopping, in order to permit the continuous or semi-continuous treatment, thus making possible an excellent pace.

At the end of the chain, the matured floc which is obtained is favorable for the extraction of the solid materials by scraping or another type of separation obtained of the released water.

Advantageously, the soft impact of the floc on itself is created by exiting of the floc vertically or substantially vertically in the form of a fountain (or a jet) into a container which is open to atmospheric pressure.

With gentle degassing of this type by putting floc into contact with the air. There is no breakage of the floc, which has the effect of avoiding excess consumption of polymer, and thus the sustained release of polymer into the filtrate.

In addition, the energy of the jets of sludge emitted into the empty upper volume of the container which is open to the atmosphere permits better incorporation of the flocculant into the sludge (which makes it possible to accelerate the flocculation).

Also advantageously, the upper neck for ejection of the sludge in the form of a fountain into the container is designed to provide a volume of sludge in the low part of said container situated below said neck, such as to make possible an optimized determined time which is sufficient to mix the sludge and the flocculant.

For this purpose, the height of the neck relative to the base of the container is greater than, or equal to, 30 cm for example.

According to another advantageous embodiment, the soft impact is created by introduction or exiting of the floc into or from an intermediate chamber comprising a braking wall, and/or an area for braking of the flow.

Advantageously and for this purpose, the floc is introduced into an enclosure for passage of the floc which is open to the atmosphere (for degassing), which enclosure is provided with an intermediate chamber comprising a wall forming the braking shutter, for example a flexible wall, situated in the passage of the flow, and/or facing the introduction of said floc.

Advantageously, the braking wall is a convex semi-cylindrical wall with an axis perpendicular to the flow, and thus the top (or outer generatrix) is directed towards the flow.

In this case also, the container is designed to provide a volume of sludge in the low part of the container, such as to permit an optimized time sufficient for maturing of the floc, i.e. for constitution of a floc (mixture of the sludge and flocculant) which is homogenous and degassed.

Also advantageously, the enclosure comprises a transverse wall of the enclosure which is open in the low part, thus allowing the flocculated emulsion to be distributed at an even speed, which wall can, or need not, also act as the braking wall.

According to another embodiment, the wall or braking shutter is situated at the front of a chamber for output of the degassed flow.

According to advantageous embodiments, one and/or the other of the following provisions is also and/or additionally applied:
the flocculant is introduced into the three-phase emulsion after creation of a loss of load in the emulsion by contraction.

The contraction is for example carried out by a piping irregularity formed by a venturi or a pinch valve;
with the sludge being supplied continuously at flow rate Q (m3/h), the emulsion is created by impact of the sludge with the air injected into the sludge at a flow rate q (Nm3/h), such that q≥3Q in a first area of flow of the sludge;

the first area is a small volume which in particular is confined between two lateral walls (as in a venturi or a piping restriction for example), and is for example smaller than 0.005 m$^3$, for example contained between 10 cm3 and 200 cm3, such that the mixture of the flows of air and sludge has a speed of at least 10 m/S.

The particularly reduced size of the area of injection (for example 50 cm3) will permit excellent mixing of the sludge/air.

In fact, in this location, there is a high-speed area, giving rise to kinetic impacts, which allows the air bubbles to penetrate the bacterial floc;
the emulsion is then passed into an enclosure with a small volume (volume smaller than 200 l) before said creation of loss of load by contraction.

It should be noted that the first area and the enclosure can also be separated by a restriction (a venturi and/or an orifice) forming the two areas in two separate chambers;
the enclosure is tubular, with a mean diameter of passage contained between 10 mm and 50 mm;
the enclosure is a column with a mean diameter $d$ and a height H≥50 $d$ (for example 10 d), the sludge being introduced into the low part of the column in the gaseous bed created by the air injected at the level of said supply of sludge (for example above or below);
the flocculant is a polymer which is injected at the immediate output of the container, before putting into the atmosphere. It is for example an organic flocculant of the cationic type;
the floc is concentrated after degassing in the filtration and/or decantation device by flotation/settling of the flocculated emulsion in a volume acting as a concentrator, with the concentrated sludge being discharged continuously, for example by means of overflow.

Advantageously, by clogging to a greater or lesser extent the surface of the volume, it is possible (according to the flow rates of air and sludge used) to regulate the thickness of the floating layer, which can then and additionally settle as a result of its weight, making it possible to obtain concentrations of 100 to 120 g/l of MS, in the knowledge that the quality and transparency of the water obtained below the flocculated sludge continues to be exceptional (DCO lower than 200 mg/l, or even 100 mg/l in the case of biological sludges);
the volume is cylindrical;
the volume is formed by a parallelepiped horizontal vat;
complementary treatment of the floc is carried out downstream from the degassing by filtration and/or pressing of the floc;
the complementary treatment comprises the passage of the floc on to a rotary screening drum;
the treatment additionally comprises supplementary pressing, for example by means of a pressing plate, with pressure contained between 10 kg and 40 kg, for example 25 kg, which makes it possible to obtain a concentration of solid material which is further improved, and can be as much as 90 g per liter.
the air is injected in the direction of the flow of sludge.

The invention also proposes a device which implements the method as described above.

It also proposes a device for treatment and/or dehydration of liquid organic sludges comprising means for continuous supply of sludge at a first flow rate Q (m3/h), means for supply of air at a flow rate Q' (Nm3/h) into the sludge, in order to form an emulsion, means for supply of flocculant into the emulsion in order to form a floc, and means for filtration and/or decantation of said floc designed to separate the liquid part of the materials in suspension and recuperate it continuously, characterized in that it comprises means for degassing said floc at atmospheric pressure by means of soft impact of the floc on itself or on a flexible wall.

Advantageously, the degassing means comprise a container which is open to atmospheric pressure, and a supply of the floc by exiting of the floc vertically or substantially vertically in the form of a fountain into said container which is open to atmospheric pressure.

Also advantageously, the degassing means comprise an enclosure for passage of the floc, provided with an intermediate introduction chamber comprising a wall for braking of the flow.

Advantageously, the wall is flexible and/or curved (for example with a radius of curvature of a plurality of centimeters, for example contained between 5 cm and 100 cm), with a top which is directed towards the flow.

According to an advantageous embodiment, the device comprises means for creation of a loss of load in the emulsion by contraction before injection of the flocculant.

The contraction is for example carried out by a piping irregularity formed by a venturi or a valve, for example a pinch valve or a flap valve.

Advantageously, the device comprises means for recuperation of the matured floc in a device for separation by flotation.

According to advantageous embodiments of the device, one and/or the other of the following provisions is also and/or additionally applied:
- with the sludge being supplied continuously at a flow rate Q (m3/h), the device comprises a first area of flow of the sludge in which the emulsion is created by impact of the sludge with the air injected into the sludge at a flow rate q (Nm3/h);
- the first area is a small volume which in particular is confined between two lateral walls (as in a venturi or a piping restriction for example), and is for example smaller than 0.005 m³, for example contained between 10 cm3 and 200 cm3;
- the device comprises an enclosure in line contained between said first area where the emulsion is created and the contraction. The emulsion obtained thus passes into the enclosure with a small volume before contraction and flocculation. It should be noted that the first area and the enclosure can also be separated by a restriction (a venturi and/or an orifice) forming the two areas in two separate chambers. "Small volume" means a few tens of liters, i.e. less than 100 l;
- the enclosure is a column with a mean diameter $\underline{d}$ and a height H≥3 $\underline{d}$, the sludge being introduced into the low part of the column in the gaseous bed created by the air injected at the level of said supply of sludge (for example above or below);
- the enclosure is tubular, with a mean cross-section of passage contained between 20 cm and 80 cm;
- the means for filtration and/or decantation comprise a concentrator of sludge by flotation/settling of the flocculated emulsion in a volume acting as a concentrator, and means for continuous discharge of the concentrated sludge by gravity, for example by means of overflow;
- the volume is cylindrical;
- the volume is formed by a parallelepiped horizontal vat;
- the device comprises means for complementary treatment of the floc downstream from the means for degassing by filtration and/or pressing;
- the complementary treatment means comprise a rotary screening drum;
- they additionally comprise a supplementary plate for pressing the floc on the drum.

The invention will be better understood by reading the following description of embodiments provided hereinafter by way of non-limiting example. The description refers to the drawings which accompany it, in which.

Figure 5:
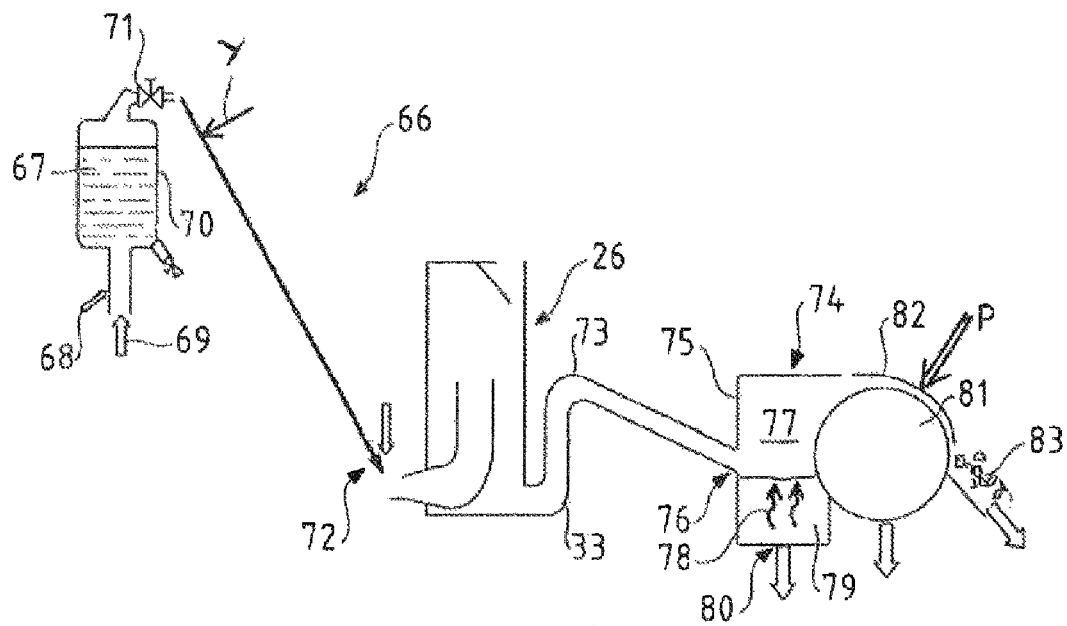
FIG. 5 shows schematically another embodiment of the device according to the invention with a rotary drum concentrator.
Figure 6:
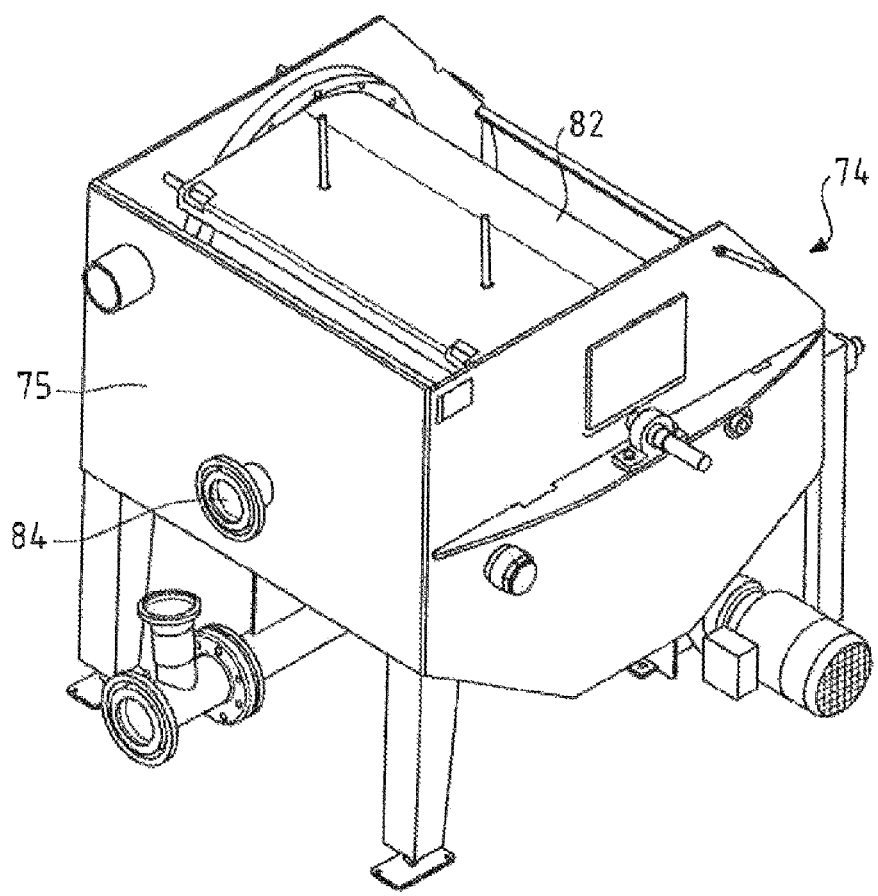
Figure 7:
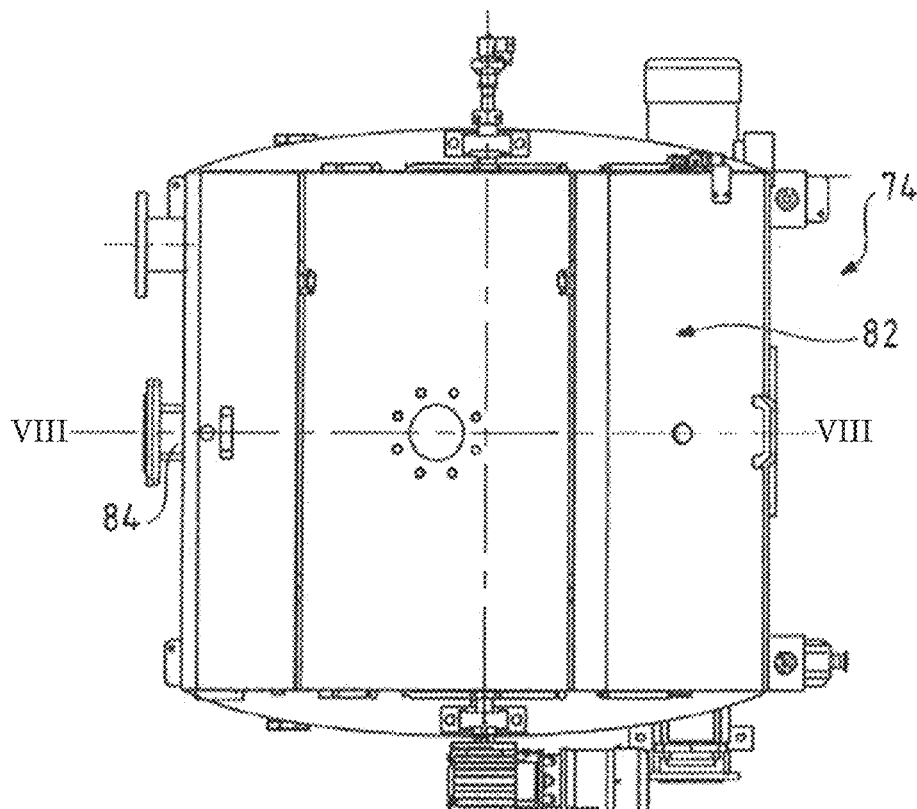
Figure 8:
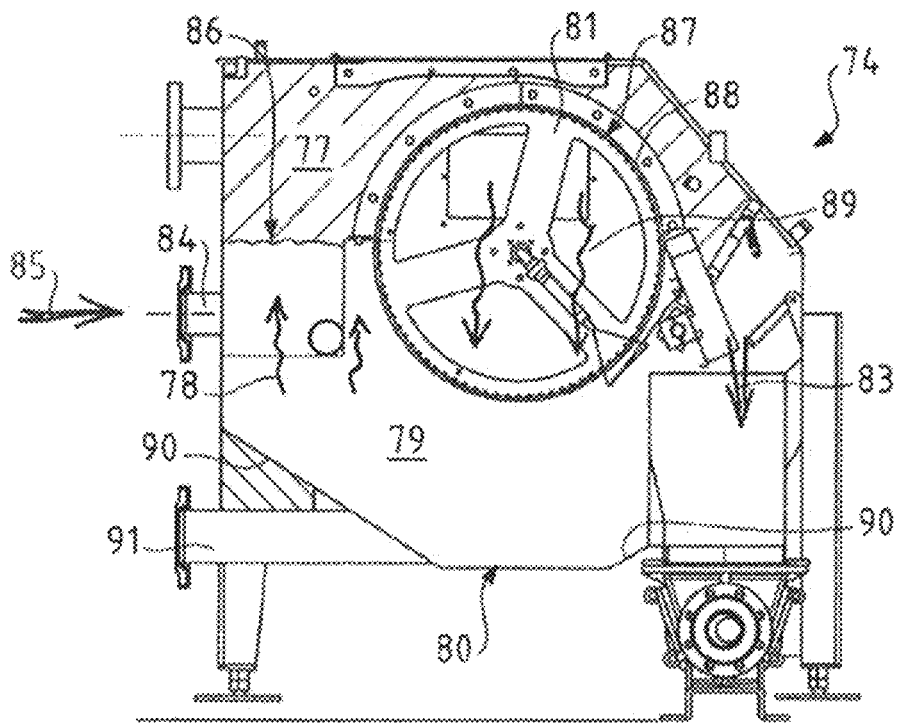

FIGS. 6, 7, and 8 are views in perspective, from above, and in cross-section along VIII-VIII in FIG. 7, of the concentrator with a drum in FIG. 5.

Figure 1:
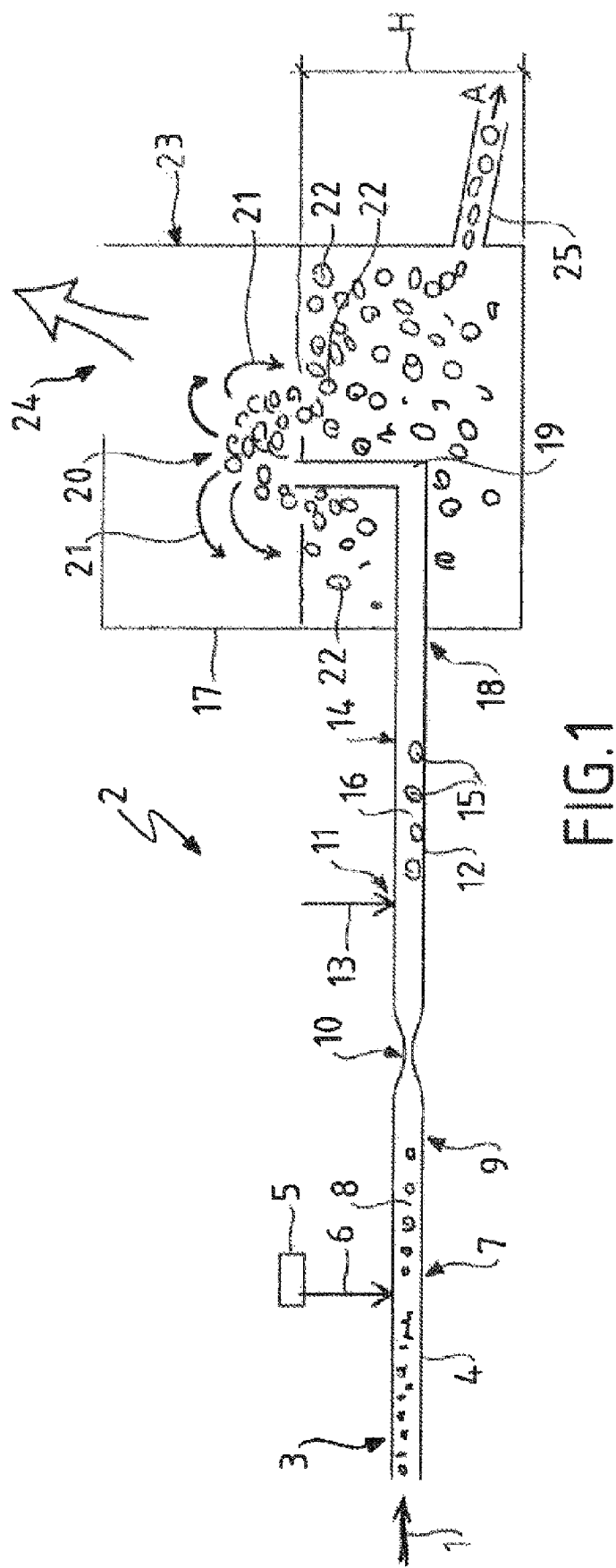
FIG. 1 is a diagram illustrating a first embodiment of the method according to the invention.

FIG. 1 shows schematically the functioning of the sludge treatment method according to a first embodiment of the invention.

The sludge 1 is introduced continuously into the device 2 at flow rate Q (m3/h) contained for example between 10 and 50 m3/h, but greater flow rates can be provided, such as, for example, 100 m³/h.

More specifically, the sludge is for example pumped from a tank (not represented) and supplies a first part 3 of a circuit, for example formed by piping 4, for example with a nominal inner diameter of between 5 and 15 cm, which piping is straight or substantially straight, for example horizontal, and is several meters long, at a pressure for example of 1 to 3 bars relative.

Means 5 for injection of air 6 (for example a compressor) at a determined pressure, for example contained between 0.2 bar and 2 bars above the supply pressure of the sludge, and at a flow rate of q' (Nm3/h), for example of 50 Nm3/h (advantageously q'≥2Q), are provided in a first area 7 of the piping.

"Nm3/h" (normal cubic meters per hour) means a start at normal conditions, i.e. for example 15° C. at atmospheric pressure.

The injection is advantageously carried out in the direction of the flow of sludge, which makes it possible to increase the speed of the three-phase emulsion 8 consisting of air, solid materials, and water obtained downstream.

In the embodiment represented in FIG. 1, the first area 7 is for example a piping part with the same diameter as the remainder of the piping 4.

However, advantageously, the first area 7 can have a smaller cross-section than the remainder of the piping, and is for example formed by the central part of a venturi (from 1 to 10 cm in length for example), or more generally by a portion with a smaller diameter forming a restriction of the piping, for example with a diameter which is two to ten times smaller than that of the remainder of said piping.

The particularly reduced size of the volume of the injection area (for example less than 1 liter) will make possible an excellent mixture of sludge/air.

In fact, in this location, there is a high-speed area, giving rise to kinetic impacts, which allows the sludge to burst in the gas.

The three-phase emulsion 8 consisting of air, (substantially organic) solid material and water thus obtained then passes into a second area 9 of the circuit, formed for example by piping which extends along a certain length L (for example of a few centimeters to 1 or 2 meters), before a restriction 10, of the same type as the first area which has just been described.

As will be seen hereinafter with reference to FIG. 4, the second area can also be formed at least partly by an enclosure. The emulsion 8 in said second area, downstream from the first area and before the restriction 10 (which can be formed by a valve with variable opening) is thus formed by a multitude of droplets of sludge in a current of air.

In the mode described here, a determined loss of load is thus created in the emulsion by contraction, in, and/or at the output from, the second area, thanks to the restriction 10, which assists further the mixing of sludge/air of the emulsion.

At 11 there is then introduction (for example via a pump, in a manner which in itself is known) into a third area formed by the continuation 12 of the piping, of a flocculant 13, for example an organic flocculant, for example a polymer of the cationic type, in order to create a floc 14 comprising flakes 15 of particles of sludge aggregated in a current of air 16, and/or mixed with a large number of bubbles of air.

At this stage, the flocculated emulsion is highly energetic, since it is formed in a restricted space formed by the continuation of the preceding piping, or by new piping 15 conveying the floc, as a result of the large quantity of air, at a flow rate which continues to be high despite the losses of load upstream.

In fact, the flow rate observed is substantially equal to Q+q, with a risk of destruction of the floc which increases together with the length of this second piping, which thus advantageously has a reduced length, for example of less than 1 m, and without irregularities (bends).

According to the embodiment of the invention which is more particularly described here, the floc or flocculated emulsion is then introduced into a degassing vessel or container 17, from the bottom 18, via an elbowed piping part 19 which is designed to eject the floc in the form of a fountain into the container, or in vertical jets 20 which fall back as precipitation (arrows 21) onto the flakes 22 already discharged by this means, thus creating a soft impact of the flocculated emulsion or floc onto itself.

By this means, a large part of the air which played both a role of dynamic driving of the flow of sludge, and a role of aeration thereof, is suddenly discharged by natural degassing, and forced into the high part 23 of the container 17, which is open at 24 to the atmosphere.

The soft impact for its part makes possible a type of natural and gentle agitation of the floc, permitting sufficient degassing without damaging the flakes, which remain light, and suitable for good dehydration by means of the flow of water released.

The respective dimensions of the height H of sludge in the container, of width and/or dimensions of the container/degasser 17, and of the discharge output 25 in the low part of the container (by gravity) to a device for separation by flotation (not represented), are designed to permit good maturation of the sludge thus flocculated.

"Good maturation" means stable and strong fixation of the polymer molecules on the bacterial floc, such as to establish a compact organic macrostructure which can be separated from the water released.

Figure 2:
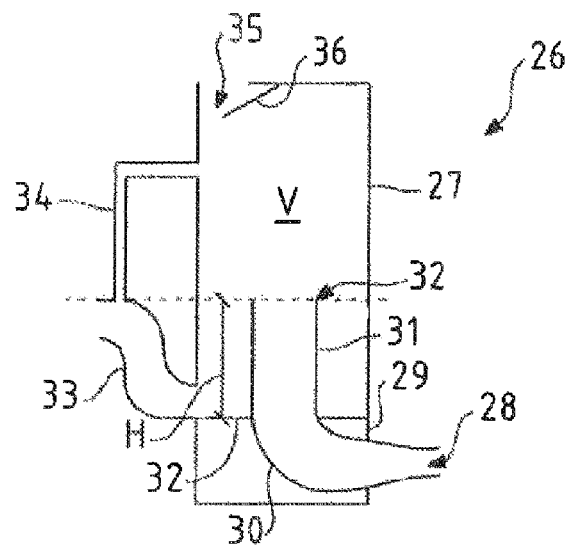
FIG. 2 illustrates schematically in cross-section the degasser/maturing vessel of the device according to the embodiment of the invention which is more particularly described here.

FIG. 2 shows schematically in cross-section a degasser 26 according to an embodiment of the invention.

The degasser comprises a container 27, which for example is cylindrical, and has a height substantially equal to 1 m.

The diameter of the container is contained for example between 200 and 300 millimeters.

The sludge is supplied at 28 by piping with a diameter of for example 80 mm, which penetrates into the low part 29 of the container, then has a bend 30 at 90°, and a cylindrical vertical part 31 with a diameter for example of 100.

The cylindrical vertical part 31 ends in an neck 32 for output of the sludge in the form of a fountain.

The container defines an inner volume V into which the cylindrical piping 31 opens.

The volume has a base 32 provided with output piping 33 with a diameter identical to that of the input piping for the flocculated emulsion.

Advantageously, a branch 34 is provided for complementary degassing of the floc after passage into the container, in the high part of the discharge piping, said high part 35' being at a height lower than the level of the sludge in the container.

The height of the high part 35' is designed to be the same as, or slightly lower than, that of the neck, relative to the base of the volume V, in order to permit a determined duration of stay/maturation of the floc in the degasser, for example 20 s.

The volume V ends in the high part in an opening 35 for output to the atmosphere, which opening is advantageously protected by an overlay 36 for blocking of sprays of sludge. In the embodiment as described, and with the input/output dimensions of the different supply piping of DN 80 mm, the height H of the floc which permits maturation thereof, i.e. between the base of the container and the periphery of the neck of the cylindrical vertical part 31, is for example contained between 400 and 600 mm, for example 500 mm.

Hereinafter in the description, identical reference numbers will be used to designate elements which are identical or similar.

Figure 2A:
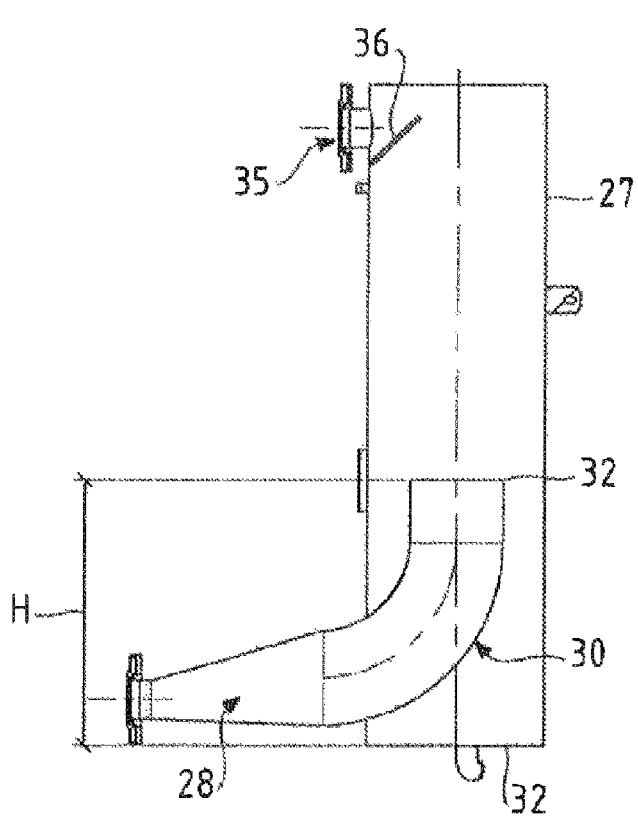
FIG. 2A is a view in cross-section along IIA-IIA in FIG. 2B.
Figure 2B:
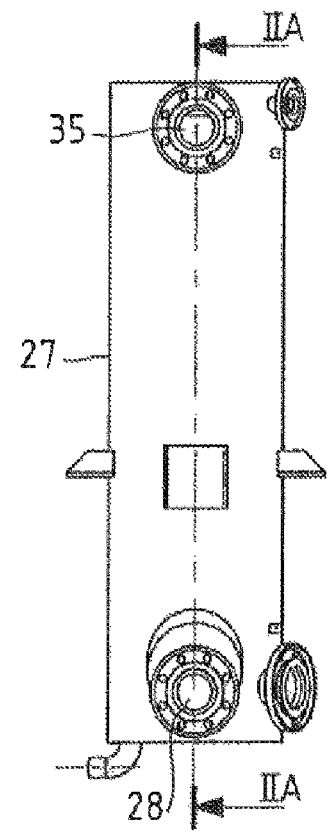
FIG. 2B is a view of an embodiment of the degasser/maturing vessel of the device of the type described with reference to FIG. 2.

FIGS. 2 and 2A represent another embodiment of a degasser according to the invention which permits degassing of the floc by means of soft impact of the floc onto itself.

The degasser can be contained in a parallelepiped measuring 1.50 m×1 m×600 mm, for treatment of sludge supplied continuously at a flow rate of 20 m3, using piping and/or commercially available sheets of plastic material or steel, which is highly advantageous.

In fact, compared with simple degassing by putting into the atmosphere, or also in comparison with a degasser using mechanical agitation to detach the air from the flakes, an improvement in the flocculation time is obtained without destruction of the flakes, which can be as much as 20%, or even 50%, whilst producing a floc which is more stable than usual.

Thus, and for example, with a device of the type described with reference to FIG. 2, with a maximum useful volume of 641 (square base of 400 mm×400 mm) an intake bend of DN 120 mm, and operation between 5 and 12 m3/h (with an air flow rate of 30 Nm3/h), a better floc is obtained, which is very consistent and floating, as well as being obtained more rapidly than with the prior art. This is apparent in particular from table I below, which also specifies the conditions of height of fall of the fountain H (on which the soft impact is dependent).

TABLE I

| Flow rate M3/h | Useful volume (1) and useful duration of stay (s) | Elevation of the fountain relative to the base (H) |
|---|---|---|
| 5 | 58/42 | 35 to 40 |
| 5 | 58/42 | 35 to 40 |
| 5 | 58/42 | 35 to 40 |
| 10 | 60/22 | 40 to 45 |
| 10 | 60/22 | 40 to 45 |
| 10 | 60/22 | 40 to 45 |
| 12 | 62/19 | 45 to 50 |
| 12 | 62/19 | 45 to 50 |
| 12 | 62/19 | 45 to 50 |

Figure 3:
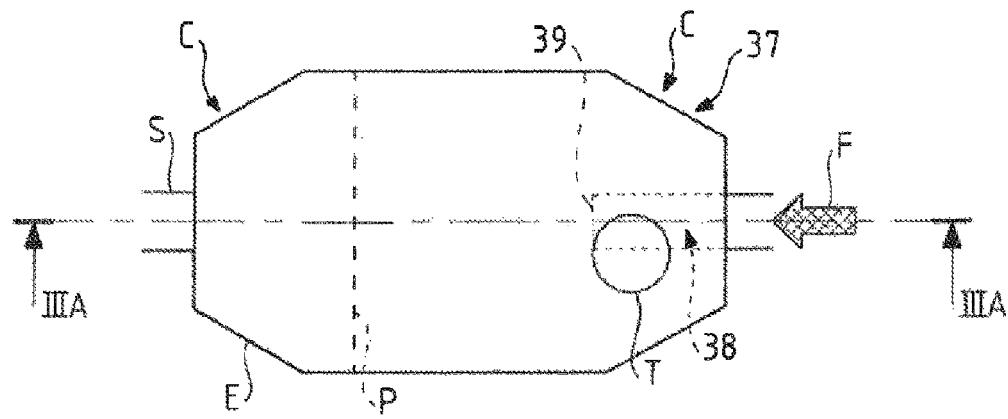
FIG. 3 is a view from above of another embodiment of the degasser/maturing vessel with a braking wall.
Figure 3A:
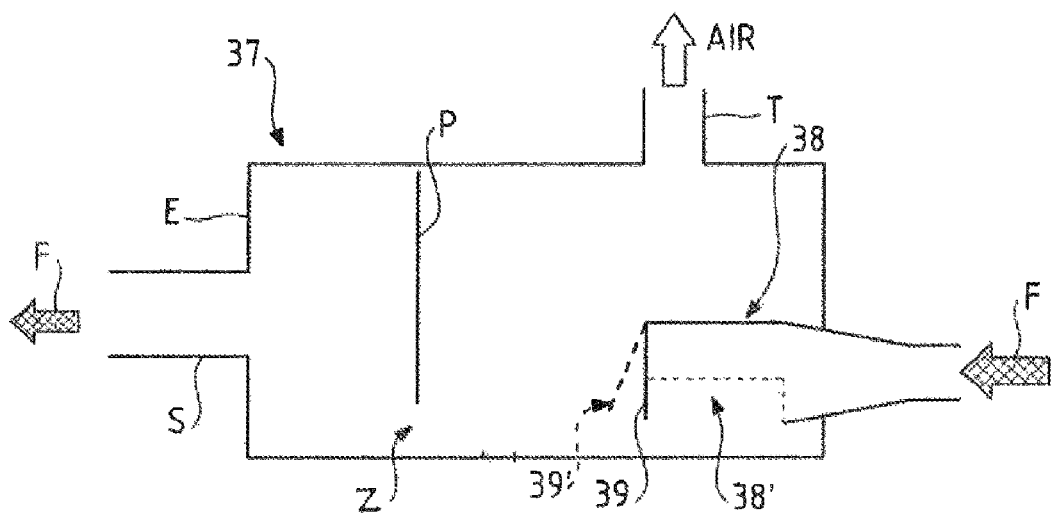
FIG. 3A is a view in corss-sectional along IIIA-IIIA in FIG. 3.

FIGS. 3 and 3A show, in a view from above and in cross-section along IIIA-IIIA, an example of a maturation degasser 37 according to another embodiment of the invention, comprising an enclosure E, which for example has a parallelepiped form with cut-off corners C, disposed horizontally relative to the intake of the flow of flocculant F, for example with dimensions of W×L×H: 300×400×300, for a treatment flow rate of 10-13 M³/h, an MS of 8 to 10 g/l and a Veff of 30 liters.

The Veff: (effective volume) is a volume of sludge/water at the input of the demodulator which makes it possible to absorb the energy necessary for the propagation and maturation of the emulsion.

This volume varies according to the different dimensions.

The volume is approximately, and for example, 30-40 liters.

The enclosure E comprises an input for the flow which opens into a chamber of passage 38, which is for example cylindrical, with a portion of cylinder 38' which is open in the low part along the entire length of the chamber (for example 200 mm in the numerical example above, and is provided at its end in the horizontal direction with a wall 39 which can brake the floc, or, when the wall is flexible, it can move towards the interior 39' under the gentle pressure of the floc F.

At the top, the enclosure comprises a tube T for discharge of the degasser air, and an output orifice S at the other end. The enclosure E can, or need not have, for example at ⅔ along its length, an intermediate distribution wall P, which permits discharge of the floc into the low part, via a widened slot Z.

A wall of this type either permits braking of the floc directly, or reinforces the homogeneity of the emulsion.

Figure 3B:
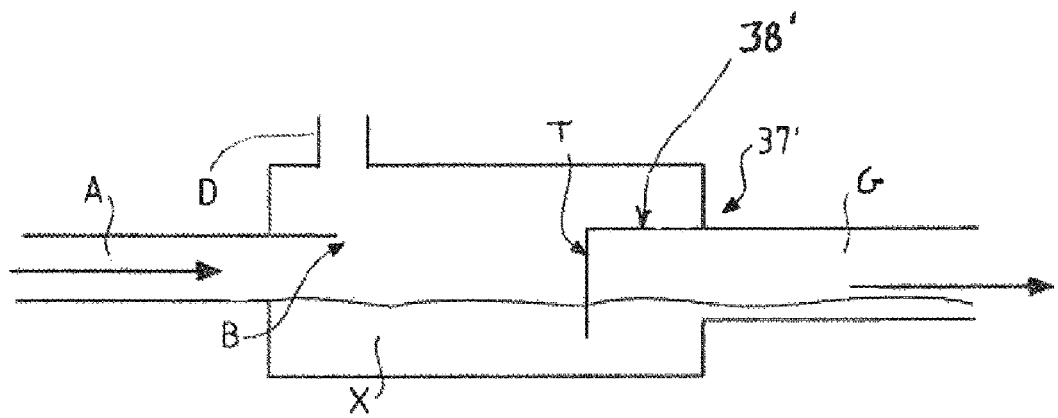
FIG. 3B is a schematic view of a variant embodiment of the degasser/maturing vessel with a braking wall.

FIG. 3B represents a longitudinal variant of the maturation degasser 37' according to another embodiment of the invention.

Although in the case of use of a degasser in combination with flotation equipment as described hereinafter, the inner wall which is designed to damp the impact of the mixture can advantageously be made of rubber or another soft material, and in the case of use with a strip filter, as a complementary treatment, use will be made for example of a more rigid wall, for example with a form which is more or less convex, which can break the floc produced slightly, but not entirely, simply reducing the size of the floc and thus making it more compressible.

More specifically, the variant in FIG. 3B shows an intake A for the emulsion and excess gas into an area B of the enclosure 37' which is filled with sludge X in the low part and gas in the high part.

The area B is closed by a wall T which damps the energy of the flow, which wall is flexible or hard (and advantageously convex).

The excess gas is extracted from the gaseous ceiling by a vent/outlet D.

The extraction of the liquid flow under poured by the wall T is carried out by the area G, which provides a calm, laminar flow, at for example less than 1 m/s, thus allowing the porous floc to be put into suspension.

For 20 to 23 m³/h of sludge charged between 10 and 30 g/l and with up to 100 Nm3/h of air added in order to form the emulsion, the enclosure has for example dimensions of W×L×H=500×200×250, with penetration into the enclosure by the output tube of 130 mm and an absorbent height of wall of 160 cm.

Figure 4:
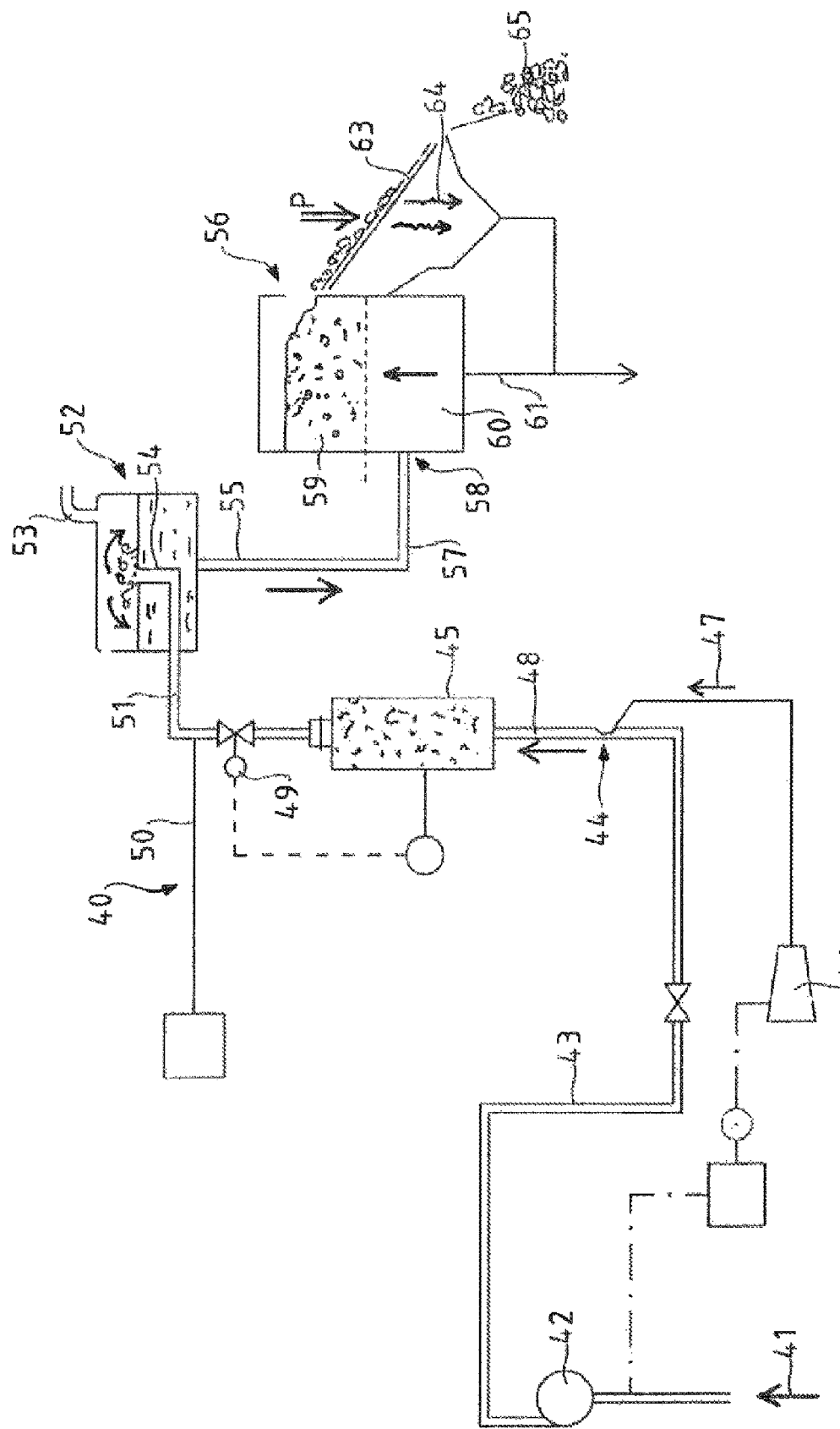
FIG. 4 shows schematically another embodiment of the device according to the invention with a concentrator.

FIG. 4 shows another embodiment of the device 40 according to the invention.

The liquid organic sludges 41 are introduced via a supply pump 42 and piping 43 towards a restriction 44, which for example is formed by a venturi in a tubular enclosure 45, for example with a height of 1 m and a diameter of 50 cm.

A compressor 46 supplies the interior of the venturi 44 with compressed air 47, tilted for example by an angle of 30° in the direction of the fluid, in order to form an emulsion 48 or a three-phase sludge, air, water mixture.

The tubular enclosure is for example maintained at a pressure of approximately 1.2 to 2 bars relative.

This can take place by means of a regulated valve 49 according to the internal pressure of the enclosure. This valve 49 constitutes a restriction, downstream from which a flocculant 50 is supplied via a supply dosing device 51, which in itself is known.

Downstream from the supply of flocculant, the emulsion 51 thus flocculated supplies the degasser 52 according to the embodiment of the invention more particularly described here.

The degasser for the flocculated emulsion or floc is open to atmospheric pressure at 53, and comprises a vertical tube 54 to supply floc in the form of a fountain, thus permitting a soft impact of the floc on itself, which makes possible a given and non-destructive degassing of the flocculated emulsion.

The sludge remains for a determined time in the interior of the degasser, for example approximately 1 to 5 minutes, and is then discharged by gravity via piping 55 towards a concentrator apparatus 56.

The degassed emulsion 57 thus arrives in the low intermediate part 58 of the appliance, and is immediately separated into solid material 59, which rises to the surface, and into transparent water 60, which is discharged continuously at 61 by gravity.

The solid material 59 is discharged in the high part of the concentrator/flotation equipment 56, for example via a chute 62, which permits the discharge of the dehydrated sludge (solid material) by gravity onto a perforated belt 63, thus permitting additional filtering of the residual water (arrows 64) which is recuperated in order to be mixed with the released water obtained at 61.

Advantageously, pressure P is exerted on the sludge, in a manner which in itself is known, making it possible to increase further the dehydration and thickening of the sludge obtained at the output from the device.

The thickened and dehydrated sludge 65 is then recuperated downstream from the belt. This makes it possible to constitute a heap of thickened sludge which is particularly favorable for constitution in the form of dried pellets which can be sold as such.

With the invention, a phenomenon of immediate flotation takes place in the concentrator apparatus 56, with a rising speed in the flake apparatus which is greater than the speeds previously observed, i.e. 20 m/h, 50 m/h, or even 100 m/h.

FIG. 5 shows another schematic embodiment of a device 66 according to the invention.

This device comprises a system for production of the three-phase emulsion 67, comprising an air supply 68 which is injected into a sludge supply 69, which itself is introduced into a small enclosure 70 ending in the high part in a restriction 71 for supply at 72, after injection of a flocculant Y, to the degasser 26 in FIG. 2.

As has been seen, this degasser also acts as a maturing vessel for the flocculated sludge obtained in the device.

This flocculated sludge which remains in the interior of the degasser for a determined time, for example 20 s, is then supplied via a bend 73 forming a hydraulic guard, to a concentrator apparatus 74.

This apparatus comprises a substantially parallelepiped housing 75 for receipt of the flocculated sludge degassed in the median or low intermediate part 76 thereof (for example by means of a branch situated halfway up the height).

The solid part 77 is separated immediately or virtually instantaneously (less than a second) (arrows 78) from the transparent water 79, which is extracted in the low part 80 of the housing, which for example is in the form of a funnel.

The solid part 77, for its part, is driven into the high part by a cylindrical drum 81 actuated for example by means of an electric motor at a speed of rotation of a few revolutions per minute.

A plate 82 with a form complementary to the cylindrical peripheral surface of the drum is provided, and exerts a pressure P on the flocculated rotated sludge, for example of 25 kg, which increases further the level of dryness of the solid materials obtained at 83.

Thanks to the invention, it is thus possible to obtain distinctly better results than with a conventional cyclonic degasser, as is shown in the preceding table I.

With reference to FIGS. 6 to 8, a more detailed description will now be provided of the concentrator 74.

The concentrator is formed by a substantially parallelepiped housing 75 which for example is contained in a parallelepiped of 1 m×1.5 m×1.5 m, in order for example to treat a flow rate of 20 m³/h of sludge.

Halfway up its height, the housing comprises a branch 84 for supply with flocculated degassed sludge 85, which will supply the concentrator 74 with sludge, below the surface 86, which is situated at a substantially constant height in the housing, for separation of the solid material 77 and liquid 79, which takes place virtually instantaneously because of the high rising speed of the sludge in the housing 75 of the flotation/separation device 74.

The organic materials 77 which are situated in the high part of the housing are driven by the outer surface 87 of the rotary drum 81, which surface is formed by a porous grid 88, rotated by a rotary motor M around a horizontal axis.

This effect of driving of the materials which are spread on the drum makes it possible to extract a constant flow rate of sludge, whilst permitting supplementary extraction of the water through the perforated drum (arrows 89), with the surplus water extracted then rejoining the lower part 80 of the housing, for example in the form of a recuperation tank with walls 90 which are inclined downwards.

The released water 79, for its part, is extracted via a branch 91 situated on the same side as the branch 84 for introduction of the flocculated degassed sludge.

Advantageously, in addition, a pressing plate 82 is provided, with pressing means 92 which for example are constituted, in a manner which in itself is known, by hydraulic or electrical jacks 93.

Thus, when the initial sludge has for example a concentration of dry material contained between 5 and grams per liter, the sludge 77 subjected to flotation has a concentration of between 30 and 50 g/l (of dry material).

It can be observed that, unexpectedly, when pressing with the plate 92 on the filtering medium takes place with a cut-off threshold of between 500 and 1,000 micrometers, the concentration will rise to 80, 90, or even 100 g/l, with the treatment upstream with the degasser having visibly given rise to a sludge constitution which permits a result of this type.

The pressure P which is exerted on the sludge must be sufficient to assist further with the extraction, without however crushing the particular porous structure of the sludge obtained.

For this purpose, the sludge is dosed and regulated according to the flow rates treated (and thus the height of the layer of sludge which is spread on the upper face of the drum), in a manner known to persons skilled in the art.

With reference to FIG. 4, a description will now be provided of implementation of the method according to the invention which is more particularly described here.

The sludge 41 is supplied with a continuous flow rate by pumping at a flow rate Q, for example of 20 m³/h, in a pipe with a diameter for example of DN 50, and a length L equal to a few meters. Simultaneously, there is continuous injection of a large flow rate of air, for example 60 Nm3/h, into the venturi 44, thus creating the three-phase emulsion, which then penetrates into the enclosure 45 with excess pressure.

The emulsion then passes via the restriction 49, for example a valve, giving rise to a new pressure/depression impact.

A flocculant, at the level of treatment necessary, is then introduced in order to create the highly aerated floc.

This floc opens out in the form of precipitation into the degassing container 52.

The soft impact of the floc on itself permits good degassing without damaging the floc, which, taking into account the dimensions of the elbowed tube, the volume V and the flow rates, requires only a few seconds (to a few minutes) in the container before being discharged, thus generating excellent maturation.

The matured floc is then transferred by gravity to the separator flotation equipment 56 in which the floc rises almost instantaneously to the surface of the water released (after a few seconds), leaving a flotation line which is nearly defined. The very clear water released is discharged downwards.

The (solid) floc for its part is discharged via the top by means of overflow and driving by gravity, or by means of a drum as described with reference to FIG. 5, in order to be pressed in a complementary manner, then discharged (heap of floc 65).

As will be appreciated, and as is also apparent from the foregoing description, the invention is not limited to the embodiments more particularly described. On the contrary it incorporates all the variants, and in particular those where all of the device is mobile, for example by being fitted on a trailer of a truck, taking into account its great compactness. This makes it possible to transfer the device from one site to another according to requirements.

The invention claimed is:

1. A method for continuous or semi-continuous treatment/dehydration of organic sludge, comprising:
introducing a flocculant having polymer molecules into a three-phase emulsion in order to create a bacterial floc in an aerated state, wherein the three-phase emulsion comprises air, solid material and water, wherein the three-phase emulsion was produced by injecting the air into the organic sludge, wherein the bacterial floc in the aerated state comprises flakes of particles of sludge aggregated in a current of the air and/or mixed with a large number of bubbles of the air;
introducing, via a pipe connected to a separate and open maturation/degasser container, the bacterial floc in the aerated state to a pool comprising previously-introduced bacterial floc situated in a lower portion of the open maturation/degasser container, wherein:
the pool comprises a surface at an interface between the pool and a layer of air, at atmospheric pressure, that is situated over the pool in an upper portion of the maturation/degasser container that is vented to the atmosphere,
the bacterial floc is introduced via a neck extending from the pipe and vertically upward through the pool, and
the bacterial floc flows, from an outlet of the neck, above the surface to form a fountain and falls, via gravity, onto the previously-introduced bacterial floc,
causing maturation and degassing of the bacterial floc, in the open maturation/degasser container and at the atmospheric pressure, by maintaining the bacterial floc within the open maturation/degasser container for a determined time such that a compact organic macrostructure is established and can be separated from the water released from the bacterial floc, wherein:
the maturation of the bacterial floc at the atmospheric pressure includes stable and strong fixation of the polymer molecules on the bacterial floc, and
the degassing of the bacterial floc at the atmospheric pressure is caused by soft impact of the bacterial floc on the previously-introduced bacterial floc within the open maturation/degasser container as the bacterial floc falls onto the previously-introduced bacterial floc; and
after the maturation and the degassing of the bacterial floc, discharging the bacterial floc into a filtration and/or decantation device.

2. The method as claimed in claim 1, wherein the neck for ejection of the sludge is configured to provide a volume of sludge in the lower portion, and wherein the lower portion is situated below the neck.

3. The method as claimed in claim 1, wherein the flocculant is introduced into the three-phase emulsion after creation of a loss of load in the three-phase emulsion by contraction.

4. The method as claimed in claim 1, wherein the determined time is a few seconds.

5. The method as claimed in claim 1, wherein the bacterial floc is concentrated after further degassing in the filtration and/or decantation device by flotation/settling in a volume acting as a concentrator, with concentrated sludge being discharged continuously.

6. The method as claimed in claim 5, wherein the volume is cylindrical.

7. The method as claimed in claim 6, wherein the volume is formed by a parallelepiped horizontal vat.

8. The method as claimed in claim 1, wherein a complementary treatment of the bacterial floc is carried out downstream from the degassing by filtration and/or pressing of the bacterial floc.

9. The method as claimed in claim 8, wherein the complementary treatment comprises passage of the bacterial floc onto a rotary screening drum.

10. The method as claimed in claim 9, wherein the complementary treatment additionally comprises supplementary pressing with pressure between 10 kg and 40 kg.

11. The method as claimed in claim 1, wherein the three-phase emulsion is formed by introducing a flow of organic sludge in a device via a venturi wherein the air is injected in the interior of the venturi the direction of the flow of the organic sludge.

12. The method as claimed in claim 1, comprising:
further concentrating, in the filtration and/or decantation device, the bacterial floc by flotation.

13. A method for continuous or semi-continuous treatment/dehydration of organic sludge, comprising the steps of
introducing a flocculant having polymer molecules into a three-phase emulsion in order to create a bacterial floc in an aerated state, wherein the three-phase emulsion comprises air, solid material and water, wherein the three-phase emulsion was produced by injecting the air into the organic sludge, wherein the bacterial floc in the aerated state comprises flakes of particles of sludge aggregated in a current of the air and/or mixed with a large number of bubbles of the air,
introducing, via a pipe connected to an open maturation/degasser container, the bacterial floc in the aerated state to a pool comprising previously-introduced bacterial floc situated in a lower portion of the open maturation/degasser container, wherein the pool ccomprises a surface at an interface between the pool and a layer of air, at atmospheric pressure, that is situated over the pool in an upper portion of the container that is vented to the atmosphere;
causing maturation and degassing of the bacterial floc, in the open maturation/degasser container and at the atmospheric pressure, by maintaining the bacterial floc within the open maturation/degasser container for a determined time such that a compact organic macrostructure is established and can be separated from the water released from the bacterial floc, wherein:
the maturation of the bacterial floc at the atmospheric pressure includes stable and strong fixation of the polymer molecules on the bacterial floc, and
the degassing of the bacterial floc at the atmospheric pressure is caused by soft impact of the bacterial floc on a wall of an energy-absorbing shutter within the open maturation/degasser container; and
after the maturation and the degassing of the bacterial floc, discharging the bacterial floc into a filtration and/or decantation device.

14. The method as claimed in claim 13, wherein the wall is flexible.

15. The method as claimed in claim 13, comprising:
further concentrating, in the filtration and/or decantation device, the bacterial floc by flotation.

16. The method as claimed in claim 13, comprising:
further concentrating, in the filtration and/or decantation device, the bacterial floc by settling.

17. The method as claimed in claim 13, wherein the determined time is a few seconds.

18. A method for continuous or semi-continuous treatment/dehydration of organic sludge, comprising:
   introducing a flocculant having polymer molecules into a three-phase emulsion in order to create a bacterial floc in an aerated state, wherein the three-phase emulsion comprises air, solid material and water, wherein the three-phase emulsion was produced by injecting the air into the organic sludge, wherein the bacterial floc in the aerated state comprises flakes of particles of sludge aggregated in a current of the air and/or mixed with a large number of bubbles of the air;
   introducing, via a pipe connected to an open maturation/degasser container, the bacterial floc in the aerated state to a pool comprising previously-introduced bacterial floc situated in a lower portion of the open maturation/degasser container, wherein the pool comprises a surface at an interface between the pool and a layer of air, at atmospheric pressure, that is situated over the pool in a upper portion of the container that is vented to the atmosphere;
   causing maturation and degassing of the bacterial floc, in the open maturation/degasser container and at the atmospheric pressure by maintaining the bacterial floc within the open maturation/degasser container for a determined time such that a compact organic macrostructure is established and can be separated from the water released from the bacterial floc, wherein:
      the maturation of the bacterial floc at the atmospheric pressure includes fixation of the polymer molecules on the bacterial floc, and
      the degassing of the bacterial floc at the atmospheric pressure is caused by soft impact of the bacterial floc on a wall of an energy-absorbing shutter within the open maturation/degasser container; and
   after the maturation and the degassing of the bacterial floc, discharging the bacterial floc into a device configured to further concentrate the bacterial floc by flotation; and
   further concentrating, via the device, the bacterial floc by the flotation.

19. The method as claimed in claim 18, wherein the determined time is a few seconds.

* * * * *